(12) United States Patent
Schouhamer Immink

(10) Patent No.: US 6,920,184 B1
(45) Date of Patent: Jul. 19, 2005

(54) TRANSMISSION SYSTEM

(75) Inventor: Kornelis Antoine Schouhamer Immink, Geldrop (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/575,605

(22) Filed: May 22, 2000

(30) Foreign Application Priority Data

May 21, 1999 (EP) .............................................. 99201607

(51) Int. Cl.$^7$ ............................................ H04L 27/28
(52) U.S. Cl. ..................................... 375/295; 370/208
(58) Field of Search ................................ 375/260, 253, 375/295, 377; 341/173; 370/464, 208, 209; 455/91; 714/757

(56) References Cited

U.S. PATENT DOCUMENTS 5,710,990 A * 1/1998 Long et al. ................ 455/103
6,125,103 A * 9/2000 Bauml et al. ............... 370/203

FOREIGN PATENT DOCUMENTS

EP  0942566 A2  9/1999
WO  9810567 A1  3/1998

OTHER PUBLICATIONS

Peak to Average Power Reduction for OFDM Schemes by Selective Scrambling, by P. Van Eetvelt, Electronics Letters, Oct. 1996, vol. 32, No. 21, XP 000683518.

A Comparison of Peak Power Reduction Schemes for OFDM by Stefan H. Miller et al., IEEE 1997, XP 000737500.

Reducing the Peak to Average Power Ratio of Multicarrier Modulation by Selected Mapping, by R.W. Bauml et al, Electronics Letters, Oct. 1996, vol. 32, No. 22, XP 000643915.

* cited by examiner

*Primary Examiner*—Tesfaldet Bocure
*Assistant Examiner*—Pankaj Kumar
(74) *Attorney, Agent, or Firm*—Steven R. Petersen

(57) ABSTRACT

The transmission system according to the invention comprises a transmitter (10) and a receiver (1 2). The transmitter (10) can transmit datawords via a multicarrier signal (11) to the receiver (12). In order to reduce the crest factor of this multicarrier signal (11) the transmitter (10) comprises a generator (20) and a selector (22). The generator (20) generates for each dataword (19) a number of alternative sequences (21) by combining mutually different digital words with the dataword (19). For this purpose, the generator (20) include an augmentor (40) and a scrambler (42). The augmentor (40) generates for each dataword (19) a number of intermediate sequences (41) by combining the digital words with the dataword (19). These intermediate sequences (41) are scrambled by the scrambler (42) in order to form the alternative sequences (21). From these alternative sequences (21) the alternative sequence with the lowest peak power value (23) is selected for transmission to the receiver (12).

12 Claims, 2 Drawing Sheets

TRANSMISSION SYSTEM

BACKGROUND OF THE INVENTION

The invention relates to a transmission system for transmitting datawords via a multicarrier signal from a transmitter to a receiver, the transmitter comprising a generator for generating for each dataword a number of alternative sequences, and the transmitter further comprising a selector for selecting the alternative sequence with the lowest peak power value for transmission to the receiver.

The invention further relates to a transmitter for transmitting datawords via a multicarrier signal to a receiver and a method of transmitting datawords via a multicarrier signal from a transmitter to a receiver.

A transmission system according to the preamble is known from WO 98/10567. Multicarrier transmission systems, such as systems employing Orthogonal Frequency Domain Multiplexing (OFDM), enable the transmission of data at a relatively high rate. OFDM, also known as Multicarrier Modulation (MCM) or Discrete MultiTone modulation (DMT), is a technique by which data is transmitted by modulating several low bit rate carriers in parallel, rather than one high bit rate carrier. OFDM is spectrally efficient, and has been shown to be effective for, for example, high performance digital radio links. OFDM is also being used in Digital Subscriber Line systems, e.g. ADSL- or HDSL-systems.

An important characteristic of a multicarrier signal is the crest factor, defined as the ratio of the peak value of an AC waveform to its Root Mean Square (RMS) value. In an OFDM system the crest factor can be high since it is possible for the signals on each of the carriers to be in phase, which gives rise to a relatively high peak value, but on average the phases will be randomly distributed, which gives rise to a much lower mean value. For example, in a 16 carrier OFDM system the peak power can be 16 times the mean transmission power.

As most amplifiers have a limited linear range, the (average) power of the OFDM signal must be made much smaller than that of a typical single-carrier signal in order to prevent clipping. Usually a so-called back-off of 10–12 dB is applied. Clipping of the OFDM signal results in a decrease of the signal itself, and the distortion manifests itself as additive noise.

In the known transmission system the crest factor is reduced in two steps: first a number of alternative sequences are generated for each dataword, and second the alternative sequence with the lowest peak power value is selected for transmission to the receiver. The alternative sequences are generated by multiplying carrier values, i.e. the multicarrier representation of the datawords, with arbitrarily selected modification vectors.

SUMMARY OF THE INVENTION

An object of the invention is to provide a transmission system for transmitting datawords via a multicarrier signal from a transmitter to a receiver, wherein the alternative sequences are generated in a different way. This object is achieved in the transmission system according to the invention, which is characterized in that the generator is embodied so as to combine mutually different digital words with the dataword in order to form the alternative sequences. The digital words can be combined with the dataword simply by placing the digital words in front of the dataword or by placing the dataword in front of the digital words.

A first embodiment of the transmission system according to the invention is characterized in that the generator comprises an augmentor for generating for each dataword a number of intermediate sequences by combining the digital words with the dataword, the generator further comprising a scrambler for scrambling the intermediate sequences in order to form the alternative sequences. The intermediate sequences can be generated by the augmentor simply by placing the digital words in front of the dataword or by placing the dataword in front of the digital words. The inclusion of the mutually different digital words in the intermediate sequences has the effect that the scrambler, which is preferably a self-synchronized scrambler, is initialized for each intermediate sequence with a different digital word. Hence, the alternative sequences are relatively good randomisations of the dataword.

A second embodiment of the transmission system according to the invention is characterized in that the augmentor is embodied so as to generate for each dataword $2^r$ intermediate sequences by combining all possible digital words of length r with the dataword. In this way a set of alternative sequences is obtained which is optimally randomized.

A third embodiment of the transmission system according to the invention is characterized in that the generator comprises a splitter for splitting the dataword and the digital words into fragments, the generator further comprising a combiner for combining the fragments in order to form the alternative sequences. The combiner generates for each digital word an alternative sequence by randomly mixing the fragments of that digital word with the fragments of the dataword.

A fourth embodiment of the transmission system according to the invention is characterized in that the selector comprises an Inverse Discrete Fourier Transformer for calculating for each alternative sequence the Inverse Discrete Fourier Transform (IDFT), the selector further comprising means for determining for each alternative sequence the maximum of the calculated IDFT values, the selector also comprising means for selecting the alternative sequence with the lowest maximum for transmission to the receiver. By these measures the alternative sequence with the lowest peak power value can be determined effectively.

BRIEF DESCRIPTION OF THE DRAWING

The above object and features of the present invention will be more apparent from the following description of the preferred embodiments with reference to the drawings, wherein.

DESCRIPTION OF THE PREFERRED EMBODIMENTS

Figure 1:
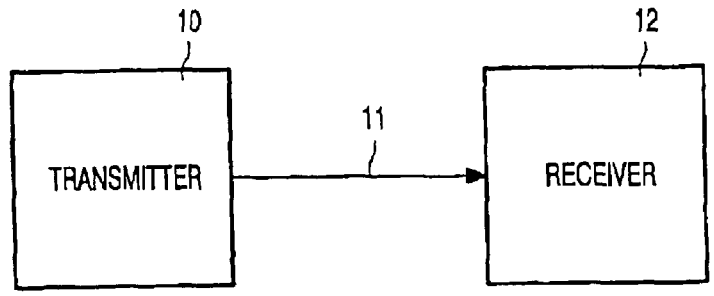
FIG. 1 shows a block diagram of an embodiment of a transmission system according to the invention.

FIG. 1 shows a block diagram of an embodiment of a transmission system according to the invention. In such a transmission system datawords are transmitted via a multi-carrier signal 11 by a transmitter 10 to a receiver 12. The transmission system may comprise further transmitters 10 and receivers 12. The transmitters 10 and the receivers 12 can be of many different types depending on the particular application area. For example, in a Wireless Asynchronous Transfer Mode (WATM) system which supports high speed, short distance radio links between computer systems, a two-way radio communication link could be established between a personal computer and a printer. For this purpose, the personal computer and the printer are both equipped with a transmitter 10 and a receiver 12. Alternatively, in a Digital Audio Broadcast (DAB) system the transmitter 10 could be part of a radio broadcast station, while the receiver 12 could be included in a car radio.

Figure 2:
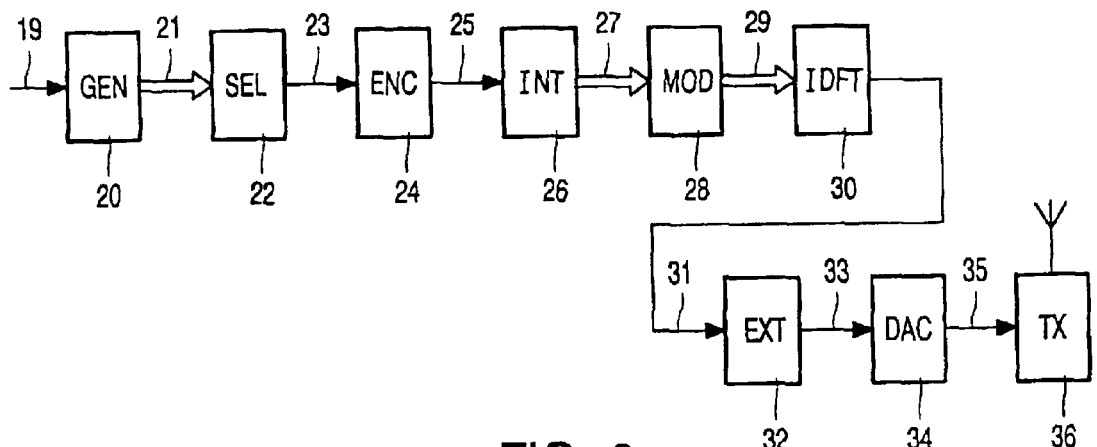
FIG. 2 shows a block diagram of part of an embodiment of a transmitter according to the invention.

FIG. 2 shows a block diagram of a part of an OFDM transmitter 10 according to the invention. The part that is shown relates to the encoding of an input bitstream 19 and its modulation for transmission. Operational parameters of all blocks shown are controlled by a controller (not shown). The bitstream 19 comprises datawords 19 to be transmitted, passed from a Medium Access Control (MAC) layer. The datawords 19 are first passed to a generator 20, which generates for each dataword 19 a number of alternative sequences 21. Next, in a selector 22 the alternative sequence with the lowest peak power value 23 is selected for transmission to the receiver 12. This selected alternative sequence 23 is passed to an encoding block 24, which generates a required stream of symbols 25 in an appropriate form for the modulation scheme being used for transmission, for example two bit symbols if Differential Quadrature Phase Shift Keying (DQPSK) is to be used. An interleaver 26 takes this stream of input symbols 25 and outputs each symbol onto a respective one of its parallel output lines 27. Each output line corresponds to an OFDM carrier for transmission, so the number of output lines 27 from the interleaver 26 is the same as the number of carriers. The symbols on each of the output data lines 27 from the interleaver 26 are then modulated by a modulator 28 using the required modulation scheme, for example DQPSK. The modulated data 29 is then inverse discrete Fourier transformed by an IDFT block 30 (or equivalently is inverse fast Fourier transformed), which block also recombines the output data 27 into a serial stream 31. A guard band between OFDM symbols is added by an extender 32, to reduce problems of inter-symbol interference, before the data 33 is passed to a digital to analogue converter 34. The output signal 35 thereof is then passed to radio transmission means 36, which translate it to the required frequency and amplify it for transmission to the receiver 12.

Figure 3:
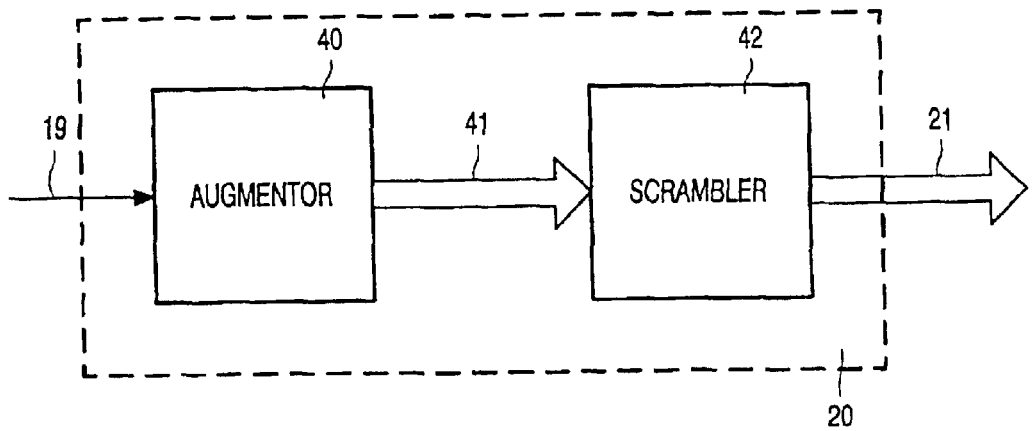
FIG. 3 shows a block diagram of a first embodiment of a generator for use in a transmission system according to the invention.

FIG. 3 shows a block diagram of a generator 20 for use in a transmission system according to the invention. The generator 20 comprises an augmentor 40 that generates for each dataword 19 a number of intermediate sequences 41 by combining mutually different digital words with the dataword 19. The intermediate sequences 41 can be generated by the augmentor 40 simply by placing the digital words in front of the dataword 19 or by placing the dataword 19 in front of the digital words. The generator 20 further comprises a scrambler 42 that scrambles the intermediate sequences 41 in order to form the alternative sequences 21.

The inclusion of the mutually different digital words in the intermediate sequences 41 has the effect that the scrambler 42, which is preferably a self-synchronized scrambler, is initialized for each intermediate sequence 41 with a different digital word. Hence, the alternative sequences 21 are relatively good randomisations of the dataword 19.

Preferably the augmentor 40 is embodied so as to generate for each dataword 19 $2^r$ intermediate sequences 41 by combining all possible digital words of length r with the dataword 19. In this way a set of alternative sequences 21 is obtained which is optimally randomized.

Figure 4:
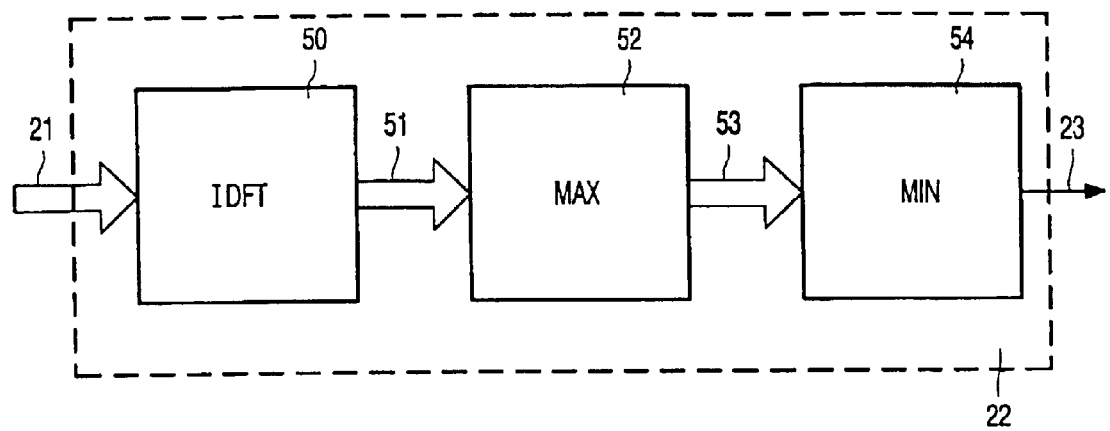
FIG. 4 shows a block diagram of a selector for use in a transmission system according to the invention.

FIG. 4 shows a block diagram of a selector 22 for use in a transmission system according to the invention. The selector 22 comprises an Inverse Discrete Fourier Transformer 50 that calculates for each alternative sequence 21 the Inverse Discrete Fourier Transform (IDFT). The selector 22 further comprises means 52 that determine for each alternative sequence 21 the maximum of the calculated IDFT values 51. The selector 22 also comprises means 54 that select the alternative sequence 21 with the lowest maximum 23 for transmission to the receiver 12.

For example, if the augmentor 40 is embodied so as to generate the intermediate sequences 41 by placing all digital words of length r in front of the dataword 19, the augmentor 40 generates from a dataword x a set of intermediate sequences $B_x = \{b_1, \ldots, b_M\}$, wherein:

$b_1 = (0, 0, \ldots, 0, x_1, \ldots, x_m)$ $b_2 = (0, 0, \ldots, 1, x_1, \ldots, x_m)$

. . .

$b_L = (1, 1, \ldots, 1, x_1, \ldots, x_m)$

A set of alternative sequences $C_x$ is obtained by scrambling all intermediate sequences in $B_x$. Let the scrambler polynomial s(x) be denoted by:

$$s(x) = x^s + \sum_{k=1}^{s} a_k x^{s-k},$$

where s denotes the register length of the scrambler. The scrambler translates each intermediate sequence $b = (b_1, \ldots, b_n) \in B_x$ into an alternative sequence $C = (C_1, \ldots, C_n) = f(b) \in C_x$ using the recursion $$c_c = b_i + \sum_{k=1}^{s} a_k c_{i-k}.$$

Next, the alternative sequence in $C_x$ with the lowest peak power value is selected for transmission to the receiver 12. In the receiver 12 the inverse operation $b = f^{-1}(c)$ has to be performed, using the recursion $$b_c = c_i + \sum_{k=1}^{s} a_k c_{i-k}.$$

Finally, the dataword is found by deleting the first r bits.

Figure 5:
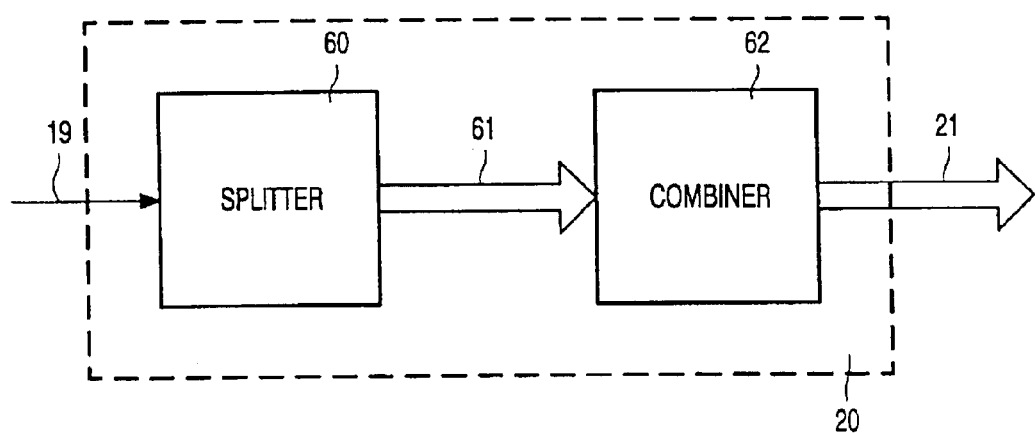
FIG. 5 shows a block diagram of a second embodiment of a generator for use in a transmission system according to the invention.

FIG. 5 shows a block diagram of another generator 20 for use in a transmission system according to the invention. The generator 20 comprises a splitter 60 that splits each dataword 19 and a number of mutually different digital words into fragments 61. These fragments may have mutually different lengths. The generator 20 further comprises a combiner 62 that combines the fragments 61 in order to form the alternative sequences 21. The combiner 62 generates for each digital word an alternative sequence 21 by randomly mixing the fragments of that digital word with the fragments of the dataword 19.

The scope of the invention is not limited to the embodiments. The invention is embodied in each new characteristic and each combination of characteristics. Any reference signs do not limit the scope of the claims. The word "comprising"

does not exclude the presence of elements or steps other than those listed in a claim. Use of the word "a" or "an" preceding an element does not exclude the presence of a plurality of such elements.

What is claimed is:

1. A transmission system for transmitting datawords via a multicarrier signal from a transmitter to a receiver, the transmitter comprising:

a generator for generating for each dataword alternative digital sequences; and a selector for selecting an alternative digital sequence with a lowest peak power value for transmission to the receiver, wherein the generator is operable to combine mutually different digital words with the dataword to form the alternative digital sequences, wherein the generator comprises:

an augmentor for generating intermediate sequences by combining the digital words with the dataword; and a scrambler for scrambling the intermediate sequences to form the alternative digital sequences, and wherein the augmentor is operable to generate $2^r$ intermediate squences by combining all possible digital words of length r with the dataword.

2. A transmission system according to claim 1, wherein the selector comprises:

an Inverse Discrete Fourier Transformer for calculating for each alternative digital sequence an Inverse Discrete Fourier Transform (IDFT);

means for determining for each alternative digital sequence a maximum of the calculated IDFT values; and means for selecting an alternative digital sequence with a lowest maximum for transmission to the receiver.

3. A transmission system according to claim 1, wherein the augmentor generates intermediate sequences by a process that does not consist of multiplying the data word and the digital words.

4. A transmission system according to claim 1, wherein the augmentor generates intermediate sequences by placing the digital words in front of the dataword or by placing the data word in front of the digital words.

5. A transmitter for transmitting datawords via a multicarrier signal to a receiver, the transmitter comprising:

a generator for generating for each dataword alternative digital sequences; and a selector for selecting an alternative digital sequence with a lowest peak power value for transmission to the receiver, wherein the generator is operable to combine mutually different digital words with the dataword to form the alternative digital sequences, wherein the generator comprises:

an augmentor for generating for each dataword intermediate sequences by combining the digital words with the dataword; and a scramble for scrambling the intermediate sequences to form the alternative digital sequences, and wherein the augmentor is operable to generate $2^r$ intermediate sequences by combining all possible digital words of length r with the dataword.

6. A transmitter according to claim 5, wherein the selector comprises:

an Inverse Discrete Fourier Transformer for calculating for each alternative digital sequence an Inverse Discrete Fourier Transform (IDFT);

means for determining for each alternative digital sequence a maximum of the calculated IDFT values; and means for selecting the alternative digital sequence with a lowest maximum for transmission to the receiver.

7. A transmitter according to claim 5, wherein the augmentor generates intermediate sequences by a process that does not consist of multiplying the data word and the digital words.

8. A transmitter according to claim 5, wherein the augmentor generates intermediate sequences by placing the digital words in front of the dataword or by placing the data word in front of the digital words.

9. A method of transmitting datawords via a multicarrier signal from a transmitter to a receiver comprising the steps of:

generating for each dataword alternative digital sequences; and selecting an alternative digital sequence with a lowest peak power value for transmission to the receiver, wherein the step of generating the alternative digital sequences comprises the step of combining mutually different digital words with the dataword to form the alternative digital sequences, wherein the step of combining mutually different digital words with the dataword comprises the steps of:

generating intermediate sequences by combining the digital words with the dataword; and scrambling the intermediate sequences to form the alternative digital sequences, and wherein $2^r$ intermediate sequences are generated by combining all possible digital words of length r with the dataword.

10. A method of transmitting datawords via a multicarrier signal according to claim 9, wherein the step of selecting an alternative digital sequence with a lowest peak power value comprises the steps of:

calculating for each alternative digital sequence an Inverse Discrete Fourier Transform (IDFT), determining for each alternative digital sequence a maximum of the calculated IDFT values, and selecting an alternative digital sequence with a lowest maximum for transmission to the receiver.

11. A method of transmitting datawords via a multicarrier signal according to claim 9, wherein the step of generating intermediate sequences by combining the digital words with the dataword does not consist of multiplying the data word and the digital words.

12. A method of transmitting datawords via a multicarrier signal according to claim 9, wherein the step of generating intermediate sequences by combining the digital words with the dataword includes placing the digital words in front of the dataword or placing the data word in front of the digital words.

* * * * *